United States Patent Office  3,450,730
Patented June 17, 1969

3,450,730
NOVEL ORGANOMETALLIC COMPLEXES
John A. Scheben, Erlanger, Ky., and Irving L. Mador and Milton Orchin, Cincinnati, Ohio, assignors to National Distillers and Chemical Corporation, New York, N.Y., a corporation of Virginia
No Drawing. Filed July 14, 1967, Ser. No. 653,344
Int. Cl. C08f 1/28
U.S. Cl. 260—429     9 Claims

ABSTRACT OF THE DISCLOSURE

This invention relates to novel organometallic complexes useful as catalytic agents in chemical reactions involving unsaturated organic compounds and which complexes have the formula:

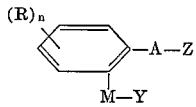

wherein $n$ is an integer from zero to four; each R is alkyl, aryl, hydroxy, nitro, halide, alkoxy, aryloxy, or a secondary alkyl or arylamino; M is ruthenium, platinum, osmium, palladium, iridium or rhodium; Y is halide, nitrate, acetate, thiocyanate or cyanide; A is —CR′=N—, (where R′ is hydrogen, alkyl or aryl), —NH—NH— or

and Z is alkyl, aryl, alkaryl, alkoxy, aryloxy, hydroxy, and alkyl or aryl amino.

---

This invention relates to novel organometallic complexes. More particularly, the invention pertains to aromatic organometallic complexes with phenyl or R-substituted phenyl groups, and having the formula:

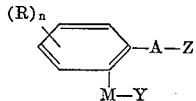 (I)

wherein;

(a) $n$ is an integer from zero to four;

(b) each R may be a lower alkyl group having from 1 to 4 carbon atoms such as methyl, ethyl, t-butyl, etc.; an aryl group having from 6 to 16 carbon atoms such as phenyl, tolyl, or cumyl, etc.; a hydroxy group; a nitro group; a halide such as chloride or bromide; a secondary alkyl or arylamino group having 2 to 12 carbon atoms such as dimethylamino, diethylamino, diphenylamino or methylphenylamino, etc.; or an alkoxy or aryloxy group having from 1 to 6 carbon atoms such as methoxy, t-butoxy, or phenoxy, etc.

(c) M is ruthenium, platinum, osmium, palladium, iridium or rhodium.

(d) Y is chloride, bromide, nitrate, acetate, thiocyanate, or cyanide groups.

(e) A is —CR′=N— (wherein R′ is hydrogen; a lower alkyl or aryl group having from 1 to 10 carbon atoms such as methyl, ethyl, propyl, phenyl, etc.); —NH—NH—; or

(f) Z is a lower alkyl group having from 1 to 10 carbon atoms, such as methyl, ethyl, hexyl, etc.; an aryl group such as phenyl, or R-substituted phenyl, wherein R is as previously defined; an alkaryl group having from 7 to 10 carbon atoms such as benzyl, 2-phenylethyl, etc.; an alkoxy or aryloxy group having from 1 to 10 carbon atoms such as methoxy, phenoxy, etc.; a hydroxy group; or an alkyl or aryl amino group having from 1 to 12 carbon atoms such as methylamino, diethylamino, diphenylamino, etc.

A specific phenyl organometallic complex encompassed by Formula (I) is as follows:

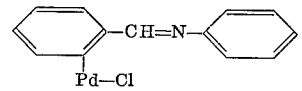 (II)

This complex is designated as chloro [o-(N-phenyl-formimidoyl) phenyl] palladium (II).

The phenyl or R-substituted phenyl organometallic complexes of this invention are useful as catalytic agents in various organic reactions. It has been found, for example, that these complexes can be effectively employed as catalysts in the hydrogenation, carbonylation, isomerization, or dimerization of unsaturated organic compounds.

These novel organometallic complexes may be prepared by utilizing, as the starting material, a phenyl or substituted phenyl compound having the formula:

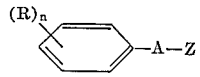 (III)

wherein $n$, R, A, and Z are as above defined in Formula I. The starting compound must have in the aromatic ring at least one hydrogen atom positioned ortho to the A substituent. Illustrative starting materials include, inter alia, such compounds as; N-benzylideneaniline; hydrazobenzene; azoxybenzene; benzaldehyde oxime; N-p-methoxybenzylidene-p-methoxy aniline; N-benzylidene-2-hydroxy aniline; p-dimethylamino-N-benzylidene aniline; N-benzylidenemethylamine; N-benzylidene-p-toluidine; p-nitrobenzylideneaniline; o-phenyl pyridine, and the like.

The organometallic complexes of this invention can be prepared by reacting one of the above starting compounds with a Group VIII noble metal or platinum group metal salt. Such salts are exemplified by the following: palladium chloride; palladium nitrate; sodium chloropalladite; platinum chloride; platinum bromide; osmium chloride; rhodium chloride; ruthenium chloride; iridium chloride; iridium bromide; and the like. Preferably the platinum group metal halides are employed for this purpose.

The resulting organometallic complexes are encompassed by Formula I. When it is desired to obtain complexes wherein Y is other than the anion of the original platinum group metal, a further reaction is required. More specifically, the metal organometallic complex, where Y is chloride or bromide, is subsequently reacted with an alkali metal salt such as sodium or potassium acetate, cyanate, nitrate, thiocyanate and the like. Specific reactants include, for example, sodium acetate, potassium cyanate, sodium nitrate, etc. In general, both the initial reaction and the subsequent reaction are carried out at ambient pressures and at temperatures which may range from about room temperature up to about 125° C. Although not essential, the aforedescribed synthesis or Y exchange reactions may be carried out in the presence of an inert solvent such as methanol, dioxane, dibutyl ether, dimethyl formamide, tetrahydrofuran, water, and the like.

The organometallic complexes of Formula I represent a sigma bonding between a carbon atom of the phenyl group and the metal atom. It has been found that in these complexes there exists coordinate bonding of the nitrogen atom of the A group to the metal atom. The organometallic complex represented by Formula II then takes the form:

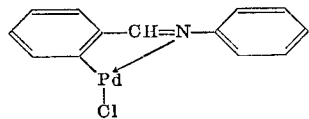

(IV)

In accordance with another aspect of the present invention, it has been found that the organometallic complexes may exist, especially as solids, in the dimeric form with electron bridging through the Y substituents, as follows:

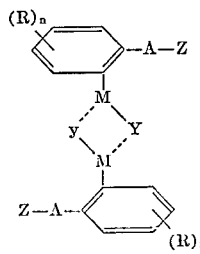

(V)

wherein $n$, R, M, Y, and Z are as above defined.

A specific dimeric phenyl organometallic complex encompassed by Formulae IV and V is as follows:

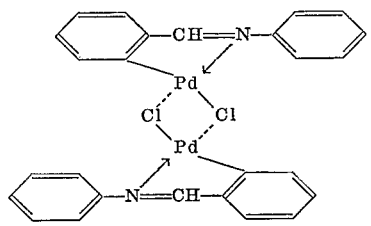

(VI)

This dimer is designated as, dichlorbis [o-(N-phenylformimidoyl)phenyl]dipalladium (II), and shows coordination bonds between the metal atom and the nitrogen atoms.

Such products may be further treated, in accordance with another aspect of this invention, with a ligand-forming compound such as an amine, amide, nitrile, alkene, nitric oxide, dimethyl sulfoxide, carbon monoxide, hexamethyl phosphoramide; as well as alkyl, cycloalkyl or aryl phosphine, stibene or arsine; and the like. The resulting complex is as follows:

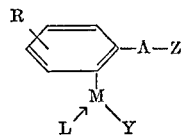

(VII)

where R, A, Z, Y and M are as above defined. L may be one of the following ligands; (a) an amine, for example, methylamine, butylamine, or toluidine; (b) an amide; for example, acetamide, dimethylformamide or dimethylacetamide; (c) an alkene; for example, ethylene, propylene, styrene, or cyclooctadiene; (d) nitric oxide; (e) dimethyl sulfoxide; (f) carbon monoxide; (g) a nitrile, for example, acetonitrile, propionitrile, or benzonitrile; (h) an alkyl, cycloalkyl or aryl phosphine, arsine or stibene for example, trimethyl phosphine, tricyclohexyl arsine, or triphenyl stibene, and other like substances.

A specific example of a ligand-containing phenyl organometallic complex is chloro(benzonitrile)[o-(N-phenylformimidoyl)phenyl]palladium (II):

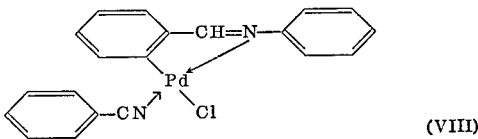

(VIII)

The invention will be more fully understood by reference to the following illustrative embodiments.

Example I

To 1.62 g. (0.009 mole) of palladium chloride in 50 ml. of tetrahydrofuran is added, with stirring 1.86 g. (0.01 mole) of N-benzylideneaniline, and the reactants are stirred over a period of twenty hours at ambient temperature, and for an additional two hours at 50° C. During this period the color of the admixture changed from an initial red-brown to a light tan. The reaction mixture is then filtered and the recovered product is washed with methanol and diethyl ether and then dried to yield 2.7 g. of the final product which melts with decomposition at 252–254° C.

Analysis, $C_{13}H_{10}ClNPd$.—Theory: Pd, 33.2. Found: Pd, 34.1.

The infrared spectrum of this compound indicates both mono and ortho disubstituted phenyl groups. The C=N stretching vibration occurs at 1620 cm.$^{-1}$, compared to a value of 1630 cm.$^{-1}$ for uncomplexed groups. The spectrum is in good agreement for the complex chloro[o-(N-phenylformimidoyl)phenyl]palladium (II) with coordinate bonding between the nitrogen and palladium.

Similarly following the procedure of Example I, but substituting an equivalent amount of platinum chloride, platinum iodide, osmium chloride, rhodium chloride, ruthenium chloride, or iridium bromide for palladium chloride, the respective platinum, osmium, rhodium, ruthenium or iridium halide derivatives are obtained.

Example II

A mixture of 2.01 g. (11.2 mmoles) of hydrazobenzene (M.P. 131° C.) and 1.86 g. (10.5 mmoles) of palladium chloride in 110 ml. of methanol was stirred at ambient temperature under nitrogen for 22 hours. The precipitate was collected, washed thoroughly with methanol and diethyl ether, and dried. 3.0 g. of product were recovered which melts with decomposition between 283–285° C.

Analysis, $C_{12}H_{11}ClN_2Pd$.—Theory: Pd, 32.7. Found: Pd, 32.7.

The infrared spectrum of this complex, chloro(o-hydrazobenzene) palladium (II), reveals N—H stretching along with bands due to mono and ortho-disubstituted phenyl groups.

Example III

The following were stirred at room temperature overnight under nitrogen: 2.24 g. (18 mmoles) of N-benzylidenemethylamine, 1.79 g. (10 mmoles) of palladium chloride, and 80 ml. of tetrahydrofuran. The initial red-brown color gradually changed to a light tan. The reaction mixture was filtered and the precipitate was washed with tetrahydrofuran, methanol, diethyl ether. After drying, the product, chloro[o-(N-phenylformimidoyl) methyl]palladium (II) weighed 2.2 g. melting with decomposition at 243–244° C.

Example IV

A mixture of 1.002 g. (5.06 mmoles) of azoxybenzene and 0.854 g. (4.8 mmoles) of palladium chloride in 120 ml. of methyl alcohol was stirred at ambient temperature under nitrogen for 48 hours. The light yellow precipitate was collected, washed with methanol and diethyl ether, then dried under vacuum, yielding 1.3 g. of a product having a decomposition point greater than 315° C.

Analysis, $C_{12}H_9ClN_2OPd$.—Theory: Pd, 31.3. Found: Pd, 30.6.

The infrared spectrum of this complex, chloro (o-azoxybenzene) palladium (II), indicates the presence of absorption bands due to the following groups: N—N, N→O, mono and ortho-disubstituted phenyl.

Example V

Platinous chloride (4.0 mmoles) and hydrobenzamide (2.4 mmoles) were added to a solvent mixture composed of 40 ml. of methanol and 30 ml. of ethyl ether. The resulting mixture was stirred under nitrogen for 48 hours, yielding 0.6 g. of a light brown solid. This complex sigma-hydrobenzamide-palladium (II) chloride melts with decomposition between 218°–225° C. An infrared spectrum of this complex indicates the presence of absorption bands due to the following groups: —C=N—, mono- and ortho-disubstituted phenyls.

Example VI

An excess of potassium cyanide (8.8 mmoles) was dissolved in 100 ml. of methanol. Added to this solution 1.6 mmoles of this complex of N-benzylideneaniline and palladium chloride complex prepared as in Example I. The mixture was stirred at ambient temperature under nitrogen for 18 hours. The light yellow mixture was filtered and then concentrated on a steam bath. The residue was diluted with an equal volume of water, filtered, and the precipitate dried. Recovered 0.5 g., 42% of theory. This complex melts with decomposition at 264–266° C. Infrared analysis indicates both mono- and di-substituted aromatic groupings, the presence of this azomethine group, and the appearance of a strong new absorption band at 4.62µ indicative of the C≡N group.

Similarly, following the procedure set forth in Example VI, but substituting an equivalent amount of lithium bromide, potassium thiocyanate, sodium nitrate or sodium acetate for the potassium cyanide, the respective bromide, thiocyanate, nitrate and acetate derivatives are obtained.

Example VII

To 4.6 mmoles of triphenyl phosphorus was added 1.5 mmoles of the product of Example I in a mixture of 40 ml. of p-dioxane and 60 ml. of diethyl ether at ambient temperature and allowed to stir 24 hours. The resultant precipitate was isolated, washed with ether and dried. Recovered 1.7 g. of chloro(triphenylphosphine) [o-(N-phenylformimidoyl)phenyl] palladium (II), which melts with decomposition 238–240° C.

The infrared spectrum of this compound indicates both mono- and ortho-disubstituted benzenes. The C=N stretching vibration occurs at 1610 cm.$^{-1}$ compared to a value of 1630 cm.$^{-1}$ for uncomplexed groups. A strong absorption band was observed at 1440 cm.$^{-1}$ due to C—P bonding.

Example VIII

About 0.12 mmole of the various palladium products of Examples I, II, and III with 62.0 m. moles of octene-1 in 50 ml. of ethyl acetate was shaken at ambient temperature under 3–4 atmospheres of hydrogen to prepare octane. The uptake of hydrogen was measured as a function of time and the results obtained are set forth below:

| Catalyst: | Time for half hydrogenation, minutes |
|---|---|
| Palladium Product of Example I | 18 |
| Palladium Product of Example II | 30 |
| Palladium Product of Example III | 33 |

As previously discussed, the organometallic complexes of this invention may be employed as catalysts for the dimerization of unsaturated compounds such as alkenes (e.g. ethylene, propylene, etc.); nitriles such as acrylonitrile; esters such as methyl acrylate; and the like. These complexes may also be used for isomerization of unsaturated compounds such as allyl benzene, 3,4-dichloro- butene 1, octene-1, etc. Furthermore, the organometallic complexes have been found to be suitable catalysts for the carbonylation of various unsaturated compounds such as allyl chloride, beta-methallyl chloride, benzyl chloride, chlorobenzene, ethylene, styrene, allyl alcohol, and the like.

While particular embodiments of this invention are shown above it will be understood that the invention is obviously subject to variations and modifications without departing from its broader aspects.

What is claimed is:

1. An organometallic complex of the formula:

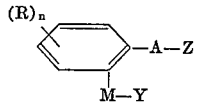

wherein $n$ is an integer from zero to four; each R is selected from the group consisting of lower alkyl, aryl, hydroxy, nitro, halide, dialkylamino, diarylamino, alkarylamino, lower alkoxy, and aryloxy; M is selected from the group consisting of ruthenium, platinum, osmium, palladium, iridium, and rhodium; Y is selected from the group consisting of chloride, bromide, nitrate, acetate, thiocyanate and cyanide; A is selected from the group consisting of —NH—NH—,

N— and —CR'=N—, wherein R' is selected from the group consisting of hydrogen, lower alkyl and aryl; and Z is selected from the group consisting of lower alkyl, aryl, alkaryl, alkoxy, aryloxy, hydroxy, alkylamino, dialkylamino, arylamino, and diarylamino.

2. The complex of claim 1, wherein M is palladium.

3. The complex of claim 1, wherein $n$ is zero; M is palladium; Y is chloride; A is —CH=N— and Z is phenyl.

4. An organometallic complex of the formula:

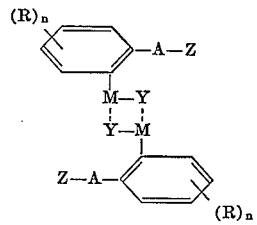

wherein $n$, R, A, Z, M and Y are as defined in claim 1.

5. An organometallic complex of the formula:

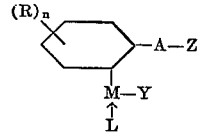

wherein $n$, R, A, Z, M and Y are as defined in claim 1, and L is a ligand selected from the group consisting of amines, amides, alkenes, nitric oxide, dimethyl sulfoxide, carbon monoxide, nitriles, alkyl phosphines, cycloalkyl phosphines, aryl phosphines, arsines, and stibenes.

6. The organometallic complex of claim 1, wherein L is selected from the group consisting of methylamine, butylamine, toluidine, acetamide, dimethylformamide, dimethylacetamide, ethylene, propylene, styrene, cyclooctadiene, nitric oxide, dimethyl sulfoxide, carbon monoxide, acetonitrile, propionitrile, benzonitrile, triphenyl phosphine, triphenyl arsine, and triphenyl stibine.

7. The organometallic complex of claim 5, wherein L is benzonitrile; $n$ is zero; M is palladium, Y is chloride; A is —CH=N—; and Z is phenyl.

8. Chloro [O-(N-phenylformimidoyl) phenyl] palladium (II).

9. Chloro (O-hydrozobenzene) palladium (II).

(References on following page)

References Cited

UNITED STATES PATENTS 3,300,472   1/1967   Kleiman et al. _____ 260—149

OTHER REFERENCES

Cope et al., J. Am. Chem. Soc. 87 (1965), p. 3272.
Bagga et al., Chem. Commun. 1965 (21), pp. 543–4.

TOBIAS E. LEVOW, *Primary Examiner.*
A. P. DEMERS, *Assistant Examiner.*

U.S. Cl. X.R.

252—429, 431; 260—143, 465.8, 476, 485, 486, 515, 526, 531, 533, 604, 683.15, 683.9

UNITED STATES PATENT OFFICE
CERTIFICATE OF CORRECTION

Patent No. 3,450,730              Dated June 17, 1969

Inventor(s) John A. Scheben, Irving L. Mador and Milton Orchin

It is certified that error appears in the above-identified patent and that said Letters Patent are hereby corrected as shown below:

The last line of Claim 1 including the terminal formula should read as follows:

sisting of  -NH-NH-,

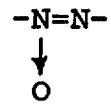

SIGNED AND SEALED

SEP 29 1970

(SEAL)
Attest:

Edward M. Fletcher, Jr.
Attesting Officer

WILLIAM E. SCHUYLER, JR.
Commissioner of Patents

FORM PO-1050 (10-69)